United States Patent [19]
Shibata

[11] Patent Number: 4,768,038
[45] Date of Patent: Aug. 30, 1988

[54] THERMAL PRINTHEAD INTEGRATED CIRCUIT DEVICE

[75] Inventor: Takuji Shibata, Hachioji, Japan

[73] Assignee: Konishiroku Photo Industry Co., Ltd., Tokyo, Japan

[21] Appl. No.: 862,617

[22] Filed: May 13, 1986

[30] Foreign Application Priority Data

May 17, 1985 [JP] Japan ................................ 60-104066
May 17, 1985 [JP] Japan ................................ 60-104067

[51] Int. Cl.[4] ...................... G01D 15/10; H01C 1/012; H05B 1/00; B05D 5/12

[52] U.S. Cl. ................................ 346/76 PH; 219/216; 219/543; 338/308; 338/309; 338/314; 427/96; 427/402; 427/34

[58] Field of Search ................. 346/76 PH; 29/610 R, 29/611; 219/216, 543; 427/58, 88, 94, 96, 101, 103, 402, 404, 34; 338/308, 309, 314

[56] References Cited

U.S. PATENT DOCUMENTS 3,515,850 6/1970 Cady, Jr. ............................. 219/216
3,609,294 9/1971 Cady et al. .......................... 219/216
4,168,343 9/1979 Arai et al. ........................... 428/426
4,259,564 3/1981 Ohkubo et al. ..................... 219/216
4,300,115 11/1981 Ansell et al. ........................ 338/314
4,591,821 5/1986 Paulson et al. ...................... 338/308

FOREIGN PATENT DOCUMENTS 56-63008 11/1981 Japan .................................. 400/120

*Primary Examiner*—E. A. Goldberg
*Assistant Examiner*—Gerald E. Preston
*Attorney, Agent, or Firm*—Jordan B. Bierman

[57] ABSTRACT

An integrated circuit device having a lower layer electrode and an upper layer electrode disposed by way of an inter-layer insulation layer on an insulation substrate, wherein the pattern for disposing the lower layer electrode and the pattern for disposing the upper layer electrode are partially or entirely made substantially identical with each other. A method of manufacturing a thermal head for use in heat-sensitive recording wherein a glaze layer is disposed on an insulation substrate, a lower layer electrode of a common electrode is deposited thereover, over the lower layer electrode an insulation layer made of silicon nitride and/or silicon oxide is coated by way of plasma reaction coating and a heat generating layer and an upper layer electrode faced with a gap to individual electrodes are deposited.

4 Claims, 3 Drawing Sheets

THERMAL PRINTHEAD INTEGRATED CIRCUIT DEVICE

BACKGROUND OF THE INVENTION

1. Field of the Invention

This invention concerns an integrated circuit device and, more specifically, it relates to an integrated circuit device in which a plurality of electrodes are disposed by at least two layers by way of an inter-layer insulation layer on an insulation substrate.

This invention also relates to a heat-sensitive recording thermal head and a method of manufacturing the same.

2. Description of the Prior Art

An integrated circuit in which a plurality of electrodes are disposed on an insulation substrate by at least two layers by way of an inter-layer insulation layer has widely been utilized, for example, as a thermal head for use in heat-sensitive recording. If there are pin holes in the inter-layer insulation layer between the two layer electrodes in the integrated circuit device, electroconduction is caused by the pin holes.

In conventional heads having heat generating elements localized to the end of an insulation substrate such that electrical supply leads are led out only from one side of the array of the heat generating elements in order that the structure is simplified by using only a set of circuit boards, printing images are observed just after the printing and no printing dusts are accumulated at the surface of the insulation substrate, it has been known so far to minimize the conductor width of the lower layer electrode so as to decrease the area where the upper layer and the lower layer electrodes intersect each other for preventing the pin hole-induced electroconduction as described above (Japanese Patent Laid-Open No. 95484/1982). If the area of the lower layer electrode is thus reduced, it results in problems that a uniform formation of the inter-layer insulation layer by utilizing the plasma reaction is difficult since the substrate is made of insulating material, that the thick portion of the film is peeled off or cracked or that pin holes are liable to be formed in the thin film portion.

Further, the thermal head for use in heat-sensitive recording is constituted such that the heat generating portion is selectively heated in a dot-like manner by recording electric signals in a state where it is abutted against paper to be recorded such as heat sensitive paper directly or by way of an ink film and recording is performed to the recording paper by the selective heating. The electrical signals are applied from the integrated circuit (hereinafter simply referred to as IC) portion to individual opposing electrodes.

Generally, the head for use in heat-sensitive recording is so constituted that a glaze layer is disposed on the heat insulation substrate, for flattening the surface and controlling the heat dissipation, the heat generating layer is deposited thereover, and a common electrode and individual electrodes (signal electrodes) opposing to each other with a gap are deposited on the heat generating layer. Then, the electrical signals are sent from the IC to the individual electrodes, by which the heat generating portions (gap portions) are selectively heated in a dot-like manner, and recording is performed on the recording paper such as heat-sensitive paper disposed at the upper surface thereof. In this case, since the resistor body situates to the inner side from the end of the head by the width of the common electrode, printed matters can not be read directly after the printing to provide a problem for increasing the printing speed. In view of the above, it has been attempted to situate the resistor body at the end of the head by employing a multi-layered wiring structure in which the common electrode is disposed below the resistor body.

In this case, if there are a number of heat generating portions selectively heated, the heat calorie transmitted to the lower part of the heat generating portions is increased and the temperature just below the resistor body is also increased and, accordingly, an insulation layer capable of withstanding high temperature is required. Further, if the part below the resistor body is heated to a high temperature, the alkali ingredient in the glaze layer (usually composed of $SiO_2$ glass powder) diffuses to intrude into the heat generating layer to change the resistance value of the heat generating layer making it instable, as well as reducing the working life. An insulation film is interposed for preventing this and for insulation between the lower and upper layer electrodes.

Known inter-layer insulation films used so far include (1) thick film glass (for instance, as disclosed in Japanese Patent Laid-Open Nos. 53-87238 and 59-91072), (2) polyimide film (Japanese Patent Laid-Open Nos. 59-54578 and 59-79776) and (3) $SiO_2$ evaporation deposition film by vapor deposition or sputtering (Japanese Patent Laid-Open Nos. 53-87238 and 53-87239).

However, since the sintering temperature for the glass film (1) is as high as 800° C., it is also required for the lower layer electrode that is made of a thick film of a noble metal series such as of Pt or Pd.

Although the sintering temperature for the polyimide film (2) is as low as 300°–400° C., the production step is complicated in view of the thick film printing and, particularly, there is a problem that it is not resistive to high temperature.

The $SiO_2$ evaporation deposition film by the vapor deposition (3) often causes pin holes due to the low density and, particularly, electroconduction is liable to be caused between the upper and lower layer electrodes in the place where there are remarkable unevennesses such as ceramics. Further, in the vapor deposition of $SiO_2$ by sputtering, since the $SiO_2$ growing speed is as low as from 50 to 100 Å/min, the coating velocity is low and it does not suitable to the mass production.

SUMMARY OF THE INVENTION

An object of this invention is to overcome the foregoing problems in the prior methods, and provides an integrated circuit device of a multi-layered wiring structure enabling to bring the heat generating elements to the end face, free from pin holes, easily attaining a uniform thickness for the inter-layer insulation layer thereby obtaining a higher yield and having excellent reliability.

The present inventor has made an earnest study for attaining the foregoing object and, as a result, has if the common electrode wider than, and corresponding in position to, that on the upper layer and at least one individual electrode corresponding in position to that on the upper layer are disposed on the lower layer, the electroconductivity of the insulation substrate is increased by the pattern for disposing the lower layer electrode, a uniform film can be formed with ease and an inter-layer insulation layer with a high film growing velocity can be formed. This invention has been achieved based on the finding as described above.

Another object of this invention is to overcome the foregoing problems in the prior insulation film and provide a highly reliable thermal head for use in thermal recording capable of coating an insulation film with less pin holes and withstanding high temperature at a high speed and free from electroconduction between the upper and lower layer electrodes even in a place where there are remarkable unevenness as in ceramics, as well as a provide method of manufacturing such a thermal head.

The thermal head for use in heat-sensitive recording according to this invention is constituted with the inter-layer insulation film comprising a film solely made of silicon nitride or silicon oxide or a composite film composed of both of them, and the film is formed by plasma reaction coating.

The method of manufacturing a thermal head for use in heat sensitive recording according to this invention comprises disposing a glaze layer on an insulation substrate, depositing thereover a lower layer electrode for the common electrode, coating over the lower layer electrode an insulation layer comprising silicon nitride and/or silicon oxide by way of plasma reaction coating and further depositing thereover a heat generating layer and an upper layer electrode in which a common electrode and individual electrodes are disposed with a gap successively.

Another objects and features of this invention will be made clearer in conjunction with the descriptions of the drawings.

DESCRIPTION OF THE PREFERRED EMBODIMENTS

Figure 1:
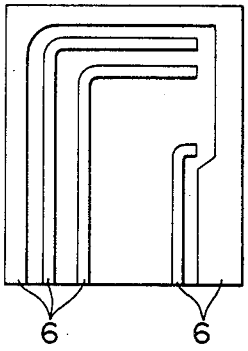
FIG. 1 is a pattern for disposing the lower layer electrode.
Figure 2:
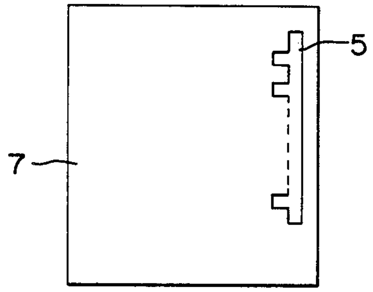
FIG. 2 is an inter-layer insulation layer.
Figure 3:
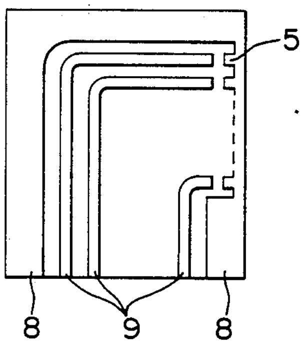
FIG. 3 is a pattern for disposing the upper layer electrode.
Figure 4:
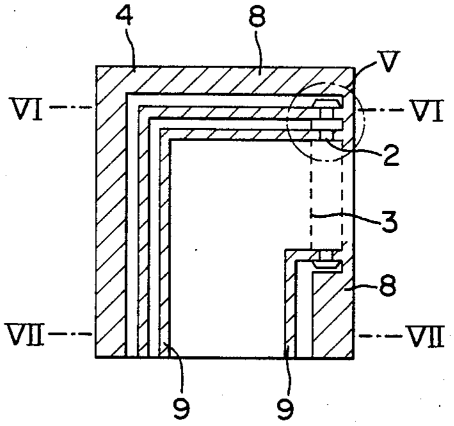
FIG. 4 is an entire view.
Figure 5:
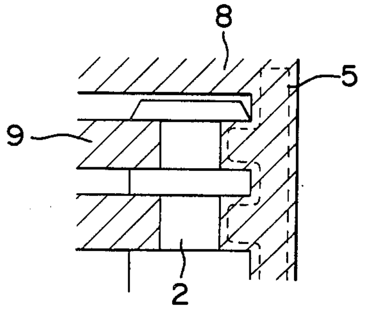
FIG. 5 is an enlarged view at the portion B in FIG. 4.
Figure 6:
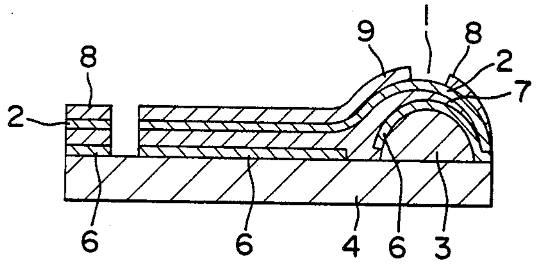
FIG. 6 is a cross sectional view taken along VI—VI in FIG. 4.
Figure 7:
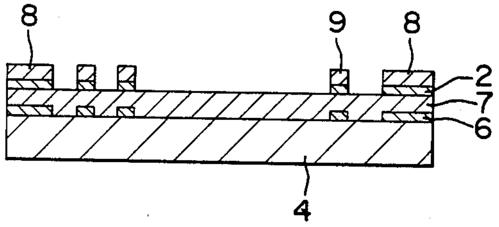
FIG. 7 is a cross sectional view taken along VII—VII in FIG. 4.

FIG. 1 is a disposing pattern for the lower layer electrode, FIG. 2 shows an inter-layer insulation layer, FIG. 3 shows a disposing pattern for the upper layer electrode, FIG. 4 is an entire view, FIG. 5 is an enlarged view for the portion B in FIG. 4, FIG. 6 is a cross sectional view for the portion VI—VI in FIG. 4 and FIG. 7 is a cross sectional view for the portion VII—VII in FIG. 4.

In the drawings, are shown an insulation substrate 4 made of alumina ceramics, etc., a glaze layer 3 for controlling the heat dissipation, lower layer electrodes 6 for a common electrode made of Mo, Ta, W, etc., an inter-layer insulation film 7 disposed thereover, a heat generating layer 2, for example, made of $Ta_2N$, Cr-Si-O, etc., at 500–1500 Å thickness, upper layer electrodes 8 for a common electrode and individual electrodes (signal electrodes) 9, for example, made of Al or Au of 1–2 μm thickness, in which the common electrode 8 and the individual electrodes 9 are disposed each other with a gap, for example, from 0.1 to 0.3 mm to constitute a heat generating portion 1. Reference numeral 5 represents a through hole.

The disposing pattern for the upper layer electrode and that for the lower layer electrode may be overlapped or displaced with each other. Further, they may be extended to the portion below the resistor body in order to widen the width of the common electrode.

As shown above, since the patterns for the lower layer and upper layer electrodes are partially or entirely made identical substantially with each other, the insulation substrate is covered with the electroconductive lower layer electrode, (for instance, it is desirably formed by more than 70% on the insulation substrate in the case where the lower layer electrode is made of Mo, by more than 80% in the case of Ta and by more than 70% in the case of W), by which the electroconductivity is improved. Further, upon forming the through hole 5, the portion of the insulation layer other than the through holes are etched with the pin holes of the resist, etc, at a portion where there are remarkable unevenness on ceramics, by which conduction between the upper layer and lower layer electrodes (if occurrs) causes no substantial problem since the lower layer electrode below the common electrode and the lower layer electrode below the individual electrodes are insulated respectively from each other. When the inter-layer insulation layer, preferably, comprising films of silicon nitride and/or silicon oxide is coated thereover by means of plasma reaction (hereinafter referred to as P-CVD), since the film can be formed more uniformly and at a greater growing speed without producing pin holes as the electroconductivity of the substrate is higher, an integrated circuit device excellent in the reliability can be obtained. The inter-layer insulation layer may also be formed by a sputtering vapor deposition process, being not restricted only to the P-CVD as described above.

The silicon nitride and/or silicon oxide is not denatured even when the heat generating portion is heated to a high temperature of from 500° to 700° C. In addition, if it is formed by the P-CVD process, the growing speed for the silicon nitride and/or silicon oxide is as high as from 300 to 1000 Å/min and the film-forming time can be reduced to as low as 5–30 minutes. This corresponds to about 1/10 as compared with the conventional sputtering case, the uniform film can be formed with ease and pin holes are eliminated for the thickness from 5000 Å, to 1 μm.

The silicon nitride film is superior to the silicon oxide film since it less causes pin hole-induced short circuitting and provides a better yield as compared with the latter. Further, a composite film comprising both of the compounds is most desirable because it has a function of absorbing the stress strains caused by silicon nitride with silicon oxide, so that a film flat with no pin holes can be formed even at a plane with a remarkable unevenness by the compensating effect between each other and because the diffusion of alkali from the glaze layer can be prevented by the silicon nitride. Further, the use of the P-CVD is most preferred since the film can be formed continuously by merely changing the reaction gas thus facilitating the formation of the composite film.

Examples for the method of forming films by way of the P-CVD process will be described below.

EXAMPLE 1

Formation of Silicon Nitride Film

Figure 8:
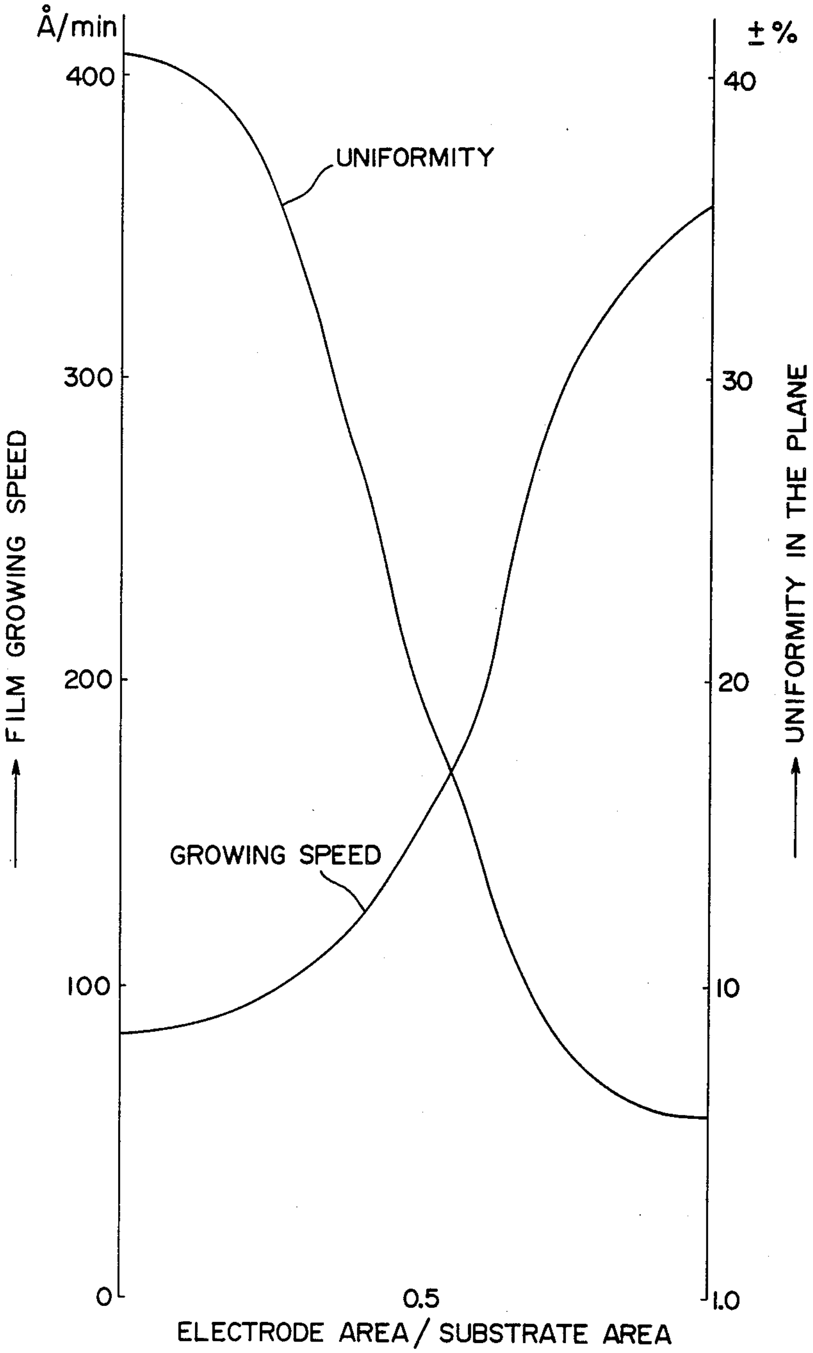
FIG. 8 is a chart showing the relationship between the electrode/insulation substrate area ratio in the disposing pattern for the lower layer electrode and the film growing speed and the uniformity within the plane of silicon nitride by P-CVD.

A silicon nitride film is prepared by using a capacitance-coupling type plasma CVD device manufactured by Advanced Semiconductor Materials Co. and carrying out plasma CVD coating on a Mo film under the conditions:

Film forming temperature: 380° C.
High frequency power: 250 W
Reaction pressure : 2.0 Torr
Reaction gas: $SiH_4$34—SCCM $NH_3$2.5 LPM
Film forming speed: 400 Å/min FIG. 8 shows the growing speed and the uniformity in the plane of a SiN film formed on the surface depending on the ratio between the ceramic area on the lower layer insulation substrate and the area of the Mo electrode disposed on the substrate. As shown in the Figure, the growing speed is made greater and the uniformity in the surface becomes extremely excellent as the ratio electrode (Mo) area/substrate (ceramics) area is made greater.

Substantially the same results are obtainable in the case of using Al or Ta instead of Mo as the electrode material.

EXAMPLE 2

Formation of Silicon Oxide

A silicon oxide film is formed on the same substrate as in Example 1 using the identical device to that in Example 1 and under the conditions:

Film forming temperature: 300° C.
High frequency power: 200 W
Reaction pressure: 1.0 Torr
Reaction gas: $SiH_4$—80 SCCM $NH_3$—3.5 LPM
Film forming speed: 600 Å/min Referring now to the manufacturing method, $SiO_2$ glass powder is applied by screen printing on an alumina ceramics substrate and then sintered to form a glaze layer (from 30 to 100 μm height). After forming a film of silicon nitride or a composite film of silicon nitride and silicon oxide at a thickness from 100–5000 Å as required on the glaze layer and the substrate, the lower layer electrode for the common electrode, for example, metal of Mo, W, Ta, etc. is formed by sputtering.

A film of silicon nitride and/or silicon oxide is coated on the lower layer electrode, as an inter-layer insulation film, to a thickness of from 5000 Å to 1 μm by means of a P-CVD process. A heat generation layer, for example, made of $Ta_2N$ or Cr—Si—O of 1000 Å thickness is disposed thereover and a common electrode and individual electrodes of the upper layer electrode are disposed further thereover while opposing to each other with a gap of from 0.1 to 0.3 mm. Finally a protection layer of $Ta_2O_5$, $Al_2O_3$ or SiN with a thickness from 2 to 10 μm is disposed as required.

EFFECT OF THE INVENTION

In the integrated circuit device according to this invention, since the disposing pattern for the lower layer electrode and that for the upper layer electrode are made partially or entirely identical with each other substantially, the electroconductivity at the surface of the insulation substrate is improved by the disposing patterns for the electrodes, whereby the growing speed for the inter-layer insulation film is also increased and the film of a uniform thickness can be obtained with ease to provide a film with no pin holes. Furthermore, undesired conduction between the upper and lower layer electrodes due to the over etching for the insulation film is scarcely eliminated upon forming the through holes and the array of heat generating elements can be provided at the end face.

Further, in the thermal head for use in heat sensitive recording according to this invention, since the inter-layer insulation film is formed from a film of silicon nitride or silicon oxide or a composite film comprising both of them, the heat generation portion suffers from no degradation at all even at a high temperature from 500° to 700° C. Further, since the inter-layer insulation film is formed by the plasma CVD, excellent effects can be obtained that the film-forming time can be reduced to about 1/10, the density is increased with less generation of pin holes and the reliability is higher when compared with the conventional sputtering method.

What is claimed is:

1. A thermal printing head having an end face adjacent a surface to be printed, a plurality of electrodes disposed on an insulation substrate in at least an upper layer and a lower layer with an inner layer of insulation therebetween, a first electrode in said upper layer comprising an upper common electrode and a plurality of individual electrodes, a second electrode in said lower layer comprising a lower common electrode, a heat generating layer between said inner layer and said first electrode and adjacent said end face, said inner layer extending to said substrate between a first portion of said lower common electrode adjacent said end face and a second portion of said lower common electrode remote from said end face.

2. The device of claim 1 wherein said inner layer is formed by plasma reaction coating of silicon nitride and/or silicon oxide.

3. The device of claim 1 wherein the width of a lower common electrode is larger than the width of an upper common electrode.

4. The device of claim 1 wherein the number of individual upper electrodes is greater than the number of individual lower electrodes.

* * * * *